United States Patent [19]
Schweizer

[11] Patent Number: 6,029,105
[45] Date of Patent: Feb. 22, 2000

[54] METHOD AND APPARATUS FOR DETECTING AND MONITORING A PARTIAL SPACE

[75] Inventor: Karl Schweizer, Radolfzell, Germany

[73] Assignee: TRW Automotive Electronics & Components GmbH & Co. KG, Germany

[21] Appl. No.: 09/029,669

[22] PCT Filed: Sep. 9, 1996

[86] PCT No.: PCT/DE96/01691

§ 371 Date: Jul. 20, 1998

§ 102(e) Date: Jul. 20, 1998

[87] PCT Pub. No.: WO97/09639

PCT Pub. Date: Mar. 13, 1997

[51] Int. Cl.[7] .................................................. B60R 21/32
[52] U.S. Cl. .............................. 701/45; 701/47; 280/734; 280/735
[58] Field of Search .................................. 701/45, 46, 47, 701/29; 280/735, 734; 180/272, 273, 271; 342/72

[56] References Cited

U.S. PATENT DOCUMENTS

| | | | |
|---|---|---|---|
| 5,330,226 | 7/1994 | Gentry et al. | 280/735 |
| 5,471,389 | 11/1995 | Hahlganss | 701/45 |
| 5,490,069 | 2/1996 | Gioutsos et al. | 701/45 |
| 5,528,698 | 6/1996 | Kamei et al. | 382/100 |
| 5,602,734 | 2/1997 | Kithil | 701/45 |
| 5,612,876 | 3/1997 | Zeidler et al. | 701/45 |
| 5,653,462 | 8/1997 | Breed et al. | 280/735 |
| 5,748,473 | 5/1998 | Breed et al. | 701/45 |
| 5,770,997 | 6/1998 | Kleinberg et al. | 701/45 |
| 5,802,479 | 9/1998 | Kithil et al. | 701/45 |
| 5,809,437 | 9/1998 | Breed | 701/29 |
| 5,829,782 | 11/1998 | Breed et al. | 701/45 |

Primary Examiner—William A. Cuchlinski, Jr.
Assistant Examiner—Arthur D Donnelly
Attorney, Agent, or Firm—Fay, Sharpe, Fagan, Minnich & McKee, LLP

[57] ABSTRACT

The method for recording and monitoring of a partial space, specifically for determination of space occupancy in a vehicle and therefrom derivable activation and/or switching of accessory devices provides for the radiation of ultra sound from a sensor (5) with transmitter and receiver in the direction of the partial space. The return beam signal supplied by the receiver is passed to an evaluation unit and analyzed. Dependent thereon, accessory devices can be activated and/or switched. The sensor for the partial space (12) employs several transmitters (6) and several receivers (7). The return signals are recorded with respect to travel time difference, thus with respect to distance and/or with respect to signal contour determined by the amplitudes and evaluated with respect to object contour in the partial space (12).

21 Claims, 3 Drawing Sheets

METHOD AND APPARATUS FOR DETECTING AND MONITORING A PARTIAL SPACE

BACKGROUND OF THE INVENTION

The subject invention is directed to methods and apparatus for recording and monitoring of partial spaces and, more particularly, to methods and apparatus particularly adapted for determining seat occupancy in a motor vehicle and, based on the seat occupancy determination, activating or deactivating one or more accessory units of the motor vehicle such as, for example, seat belts and air bags.

One such switching device is taught in DE 38 02 159 A1, whereat the device releases or eliminates an activation of at least one accessory unit allocated in a motor vehicle to an adjustable seat, such as, for example, one or several passenger restraining elements of a passenger restraining system, a seat heating unit, etc. With respect to unoccupied seats of vehicles, it is possible, according to the above device to eliminate the activation of the accessory units. To that end, a vehicle seat position is recorded relative to the vehicle and the position of the seat elements relative to each other are similarly recorded. An ultrasound sensor including a transmitter and receiver is used to record the distance of a single seat location relative to the transducer. Measuring of distances are performed on the basis of an impulse-echo transit time method.

One disadvantage of the above-noted device, however, is that such switching devices do not distinguish between objects located or disposed upon the seat, such as, for example, a distinction between passengers and infant car seats containing a child disposed upon the seat. In addition, the actual distance measuring used to perform the evaluation is usually too imprecise and is generally dependent upon prior registration of seat distances or seat positions.

SUMMARY OF THE INVENTION

The subject invention overcomes the above-noted drawbacks and disadvantages of the prior art switching devices monitor partial spaces in motor vehicles. The methods and apparatus of the present invention enable monitoring of partial spaces, specifically seats in motor vehicles, in a less complicated and more detailed mode, whereby, moreover, the evaluation device for interpreting the reflected signals also yields much better data with respect to passenger contours than the above-noted prior art system.

In accordance with the subject invention, there is provided a method and apparatus for recording and monitoring of a partial space, particularly for determining seat occupancy in a motor vehicle and, based upon said seat occupancy determination, to perform activation and/or switching of accessory units within the motor vehicle. An ultrasound signal is beamed into the partial space by a sensing device with a transmitter and receiver, the reflected or return beam signal being passed to an evaluation device whereat the reflected ultrasound signal is evaluated to thereupon determine the activation and/or switching of various motor vehicle accessory units. The sensing unit includes several transmitters and several receivers so that a sound field is generated within the partial space creating reflected or return signals. The return signals are recorded by an evaluation device with respect to distance and/or with respect to the signal contour determined by the amplitudes thereof and are thereafter evaluated in the evaluation device with respect to an object contour in the partial space.

It is an advantage of the present invention that, based on the fact that registration and monitoring of partial spaces is performed with the utilization of a sensing device having several ultrasound transmitters and receivers, such as, for example, arrays of ultrasound sensors or multi-element sensors, to also draw conclusions, in a simplified fashion, with respect to the object shape or object contour sensed in the partial spaces and, further, to ascertain whether a person or an infant car seat with a child is present on a motor vehicle seat.

It is a further advantage of the invention that activation or switching of accessory devices, such as, for example, air bags, are controlled with respect to the internal pressure thereof. As an example, in accordance with the invention, based on the orientation of an infant seat installed on a passenger seat of the motor vehicle, the internal pressure of an assigned air bag is reduced or totally switched off. In addition, the inflation speed or the increase in internal pressure of the air bag, is made dependent upon motion parameters of the seat occupants and, thus, also dependent upon an anticipated impact thrust of an object during an accident.

In accordance with another aspect of the present invention, one or more sound fields are generated in the observed partial space by the simultaneous time-staggered emission of ultrasound signals from a multiplicity of individual transmitters forming the sensing device. The structure of the observed partial space is marked by interferences and transit time effects, formed by the contour of the interior space and all objects located within the motor vehicle. The contour of the interior space is captured upon a plurality of ultrasound receivers formed in the sensing device. The space and approximate weight of an object to be recorded within the partial space is evaluated by an evaluation device, based on the signal amplitude curve over time sensed by the multiplicity of receivers forming the sensing device.

In accordance with yet another aspect of the invention, several transmitters are combined into a single sensing device for radiating ultrasound signals in different directions within the partial space to generate one of more ultrasound fields therein. The several transmitters are adapted to radiate in said different directions simultaneously, or, alternatively, in a chronologically staggered pattern.

In a more limited aspect of the invention, a dynamic sound field is created by vertically or horizontally pivotally arranging the transmitters, or, alternatively, by specially electronically targeting individual cooperating transmitters or sensor arrays or by providing multi-element sensors. A sound field generated in the partial space in this manner is dynamically adaptable by means of in-phase targeting of active elements, such as sensor arrays, to the spatial conditions of the application site and the requirements of the evaluation algorithm performed by the evaluation device. As an example, commercially available 40 kHz bending oscillators, having sound lobe envelopes from 50°–60°, relative to a 6 dB sound pressure reduction, can be employed for this purpose. However, oscillators operable within the frequency range of between 60 kHz and 80 kHz, having an opening angle of sound lobe of between 70°–80°, relative to a 6 dB sound pressure reduction, are also useful for this purpose.

In accordance with a preferred specific embodiment of the invention, an ellipsoid sound field characteristic is obtained by means of simultaneous transmission of several transmitters forming a single sensing element or, equivalently, by means of a special design of a single transmitter, which makes the subject invention particularly well suited for recording and monitoring objects having a different height than width within a monitored partial space.

In accordance with yet a further, more limited, aspect of the invention, the reflected signals sent by the receiving device are digitized to form digitized signals which are recorded in an evaluation device as amplitude versus transit time curves. Implementing these curves, the digitized signals are used by the evaluation device to perform an analysis of extracting characteristic structures and parameters from the digitized signals. This analysis is performed by the evaluation device for each of the recorded signals.

In accordance with the above, at any given point in time, the present invention subjects the obtained parameter sets to an individual evaluation. In the simplest case, the recorded signals are evaluated by means of a time window review. Using that technique, if in a given time window, the amplitude, or amplitude peak, is located above a defined threshold value, then the present invention considers an event as having occurred, such as, for example, a person occupying the passenger seat. Such time window review of the received signal can advantageously take place at several crucial locations within the passenger compartment of a motor vehicle to determine other events as having occurred.

In addition to the above, other methods of event recognition in the received signals are also within the scope of the present invention. As an example, the contour of the receiving signal is compared using a correlation method, with contours being stored in the memory of the evaluation device. The contours stored in the memory represent firmly defined events, such as, for example, a seat empty, a seat occupied by a passenger, a seat occupied by a reverse infant seat, etc. The comparison of the received signal against contours stored in the memory produce results which permit conclusions to be made with respect to the sensed contour in the partial space, including an approximation of the weight of the object sensed in the partial space. During this procedure of the correlation method, the ultrasound fields are simultaneously or also concurrently created and recorded, whereby both the ultrasound transmitters as well as the ultrasound receivers emit and receive, respectively, ultrasound signals aimed at the respective locations within the partial space, preferably, head, chest, knee areas of persons anticipated to occupy the partial space. The results of the correlation method are preferably used by the activation or control or accessory devices of the motor vehicle.

In accordance with yet a further aspect of the invention, in the event that an individual evaluation result is not clear with sufficient probability, further precision evaluation is accomplished via cross-comparisons of different data sets in order to narrow down the crucial range of results to the extent that only a single decision remains to be selected.

In accordance with yet another aspect of the invention in an alternative embodiment, the system is adapted to dynamically alter the physical measuring course based on predefined given requirements. In that regard, the alternative embodiment includes modifications in the number of recorded and/or registered signals in the sequence of generating and recording the signals, and in the composition of multiplexing the generating and recording of the signals.

In the above, a precise result is achieved with the aid of a historical representation, such as, for example, a sliding chronological means, so that the output size of the system is algorithmicly determined.

In accordance with still a more limited aspect of the invention, events that are evaluated are selective circumvented completely. This aspect of the invention is realized selectively via different safety measures, such as, activities which can be triggered by only precisely defined events, activities which can be triggered only by events occurring jointly or activities which can be triggered only by inter-linked events. An example of potentially faulty results that may be produced include a sudden change in air pressure through a sudden opening of a vehicle window which, in turn, may result in an ultrasound signal transmission disturbance. Such faulty results are correctable, for example, by comparing the previous and/or succeeding results, or by means of the combination of a real time inconclusive result with the results of other sensing devices disposed in the motor vehicle, such as, weight sensors disposed in the vehicle seats, deceleration sensors on the vehicle body, etc. Thereby, these faulty results can be bypassed. As a further example, if the occupation of a vehicle seat is indicated by a weight sensor disposed in the passenger seat, while the ultrasound sensing and evaluation device indicates an absence of a passenger based on a temporary faulty result, the air bag may, nevertheless, be activated with at least a minimal pressure.

In yet a further, more limited aspect of the invention, the ultrasound signals are emitted in the form of bursts of between to eight (8) to fifteen (15) cycles. The ultrasound signals preferably have the shape of rectangular wave pulses with beneficial minimal interferences with a mixture of the rectangular wave pulses or with other signal types. The shape of the contour of the transmission bursts for influencing specific tasks are adjustable over a wide range in order to improve the occurrence of audible clicks. In the preferred embodiment, the transmission bursts are repeated in a pulse-like fashion, whereby the repeat frequency is adapted to function based on the object observed in the partial space and, further, based on dynamic adaptation to objects in the sound field. In that regard, the repeat frequency operates with a lower repeat rate for purposes of observation as to whether or not a person or an infant seat is located on a particular vehicle seat. When, on the other hand, the head position of a person quickly changes and is observable prior to, or even during, an accident, then the repeat frequency is increased to a very high repeat rate so that small pulses between successive bursts enable a more accurate gauge on the exact position of the passenger's head as it moves within the motor vehicle during the accident.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENT

Figure 1:
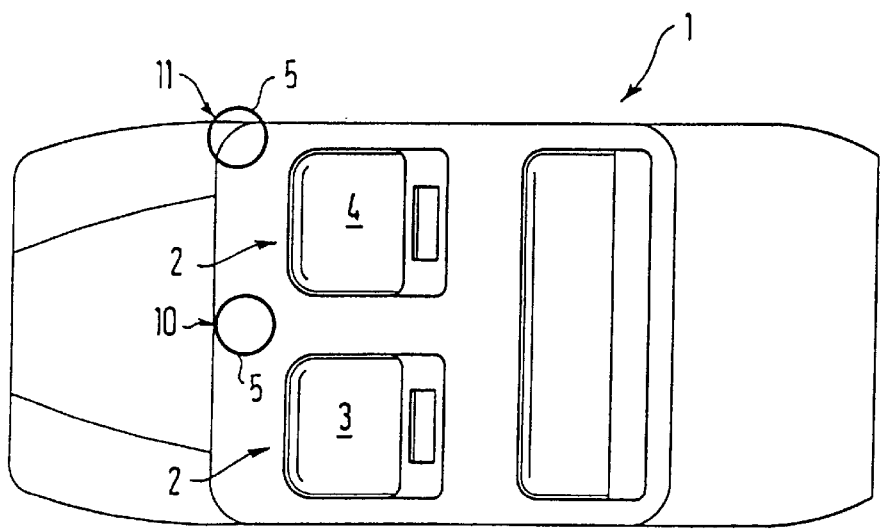
FIG. 1 is a schematic overhead view of the subject invention used in a motor vehicle.

Referring now to the drawings wherein the showings are for the purposes of illustrating the preferred embodiments of the invention only and not for purposes of limiting same, the FIGURES illustrate the method and apparatus for recording and monitoring a partial space in accordance with the present invention used in conjunction with a motor vehicle 1.

Referring now to those FIGURES, in the embodiment illustrated, the regions of interest to be recorded and monitored as partial spaces 12 are preferably the regions or spaces at the front seats 2 including, for example, a driver's seat 3 and a passenger seat 4. In accordance with the present invention, it is, however, also possible to additionally capture partial spaces of the rear area of the motor vehicle 1 such as, for example, the rear seats using sensing devices in addition to those which will be described below in conjunction with sensing the front seats 2. For sensing the rear area of the motor vehicle, the additional sensing devices are preferably arranged in the area of a B-pillar, for example, at the ceiling of the motor vehicle, in the center or on the side thereof.

In accordance with the present invention, a determination is made whether the driver's seat 3 and/or the passenger seat 4 is occupied by a person, a pair of people, or by an infant seat with a child. Based upon a determination of the occupancy of these front seats 3, 4, air bags are activated and additional units in the motor vehicle, such as restraining belts or the like, are controllable by the present invention.

Preferably, the recording and/or monitoring of the partial spaces 12 of the driver's seat 3 and the passenger seat 4 is performed using a sensing unit 5 comprised of a plurality of transmitters 6 and a plurality of receivers 7. The transmitters 6 radiate an ultra sound signal, preferably within the range of 40 kHz to approximately 80 kHz. The ultra sound signal is preferably radiated in the form of a set of bursts having 8 to 15 or more cycles. The burst length is based on a quality factor Q of the oscillating system within the ultra sound sensor of the present invention. The number of cycle bursts for optimum modulation relates to the quality factor Q by preferably being no less than 0.7 times Q. In special applications of the present invention to special motor vehicles or other spaces to be recorded and monitored, the number of cycle bursts can be varied, for example, to 20 or 30 cycles.

In accordance with the present invention, commercially available 40 kHz bending oscillators with sound lobe envelopes between 50° to 60° relative to 6 dB sound pressure reduction are utilized. However, preferably, oscillators in the frequency range of 60 kHz are used with an opening angle of the sound lobe substantially between 70°–80°.

Alternatively, additional improvements for certain applications are attainable by the present invention through use of ellipsoidal sound field characteristics. As will be described in greater detail below, the monitoring coverage is further improved through use of arrays of ultra sound sensors and multi-element sensors. Through use of these sensors, the generated sound field is dynamically adaptable by phase-correct targeting of active elements to the spatial conditions of the application location and the requirements of the algorithm used to record and monitor the partial space. Using this technique, very narrow sound lobes are generated for precise recording, monitoring, and detection as may be needed by certain applications.

As best shown in FIG. 1, the sensing device 5 is preferably arranged within the motor vehicle 1 either centrally in the region of the dome light 10, or at the A-pillar 11 of the body of the vehicle, or, alternatively, at the ceiling of the vehicle. In accordance with the invention, when the partial spaces of the rear seats are also to be captured and monitored, the sensing device 5 is preferably mounted at the B-pillars of the body of the motor vehicle 1.

Figure 4:
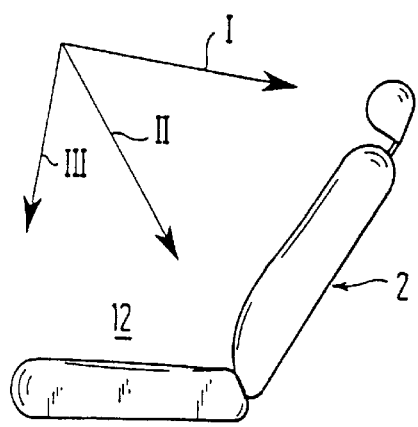
FIG. 4 is a schematic side view illustrating an arrangement of sensor devices for capturing partial space information of the driver or passenger seat in the motor vehicle of FIG. 1.
Figure 5:
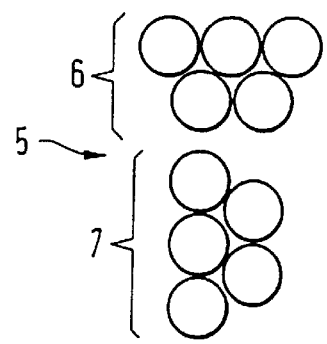
FIG. 5 is a schematic front view illustration of the sensing device used in the motor vehicle of FIG. 1 including a set of transmitters and a set of receivers arranged above and adjacent each other; and, FIG. 6 is an illustration of the signals received from the set of sensors illustrated in FIG. 4 for a set of differing occupancies of a passenger seat in the motor vehicle of FIG. 1.
Figure 2:
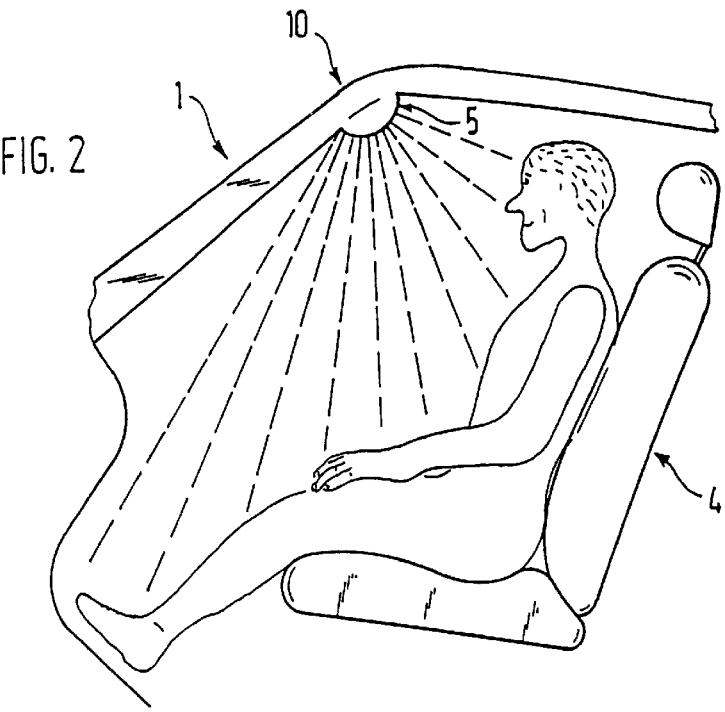
FIG. 2 is a partial side view illustrating an occupied driver's seat in the motor vehicle of FIG. 1.
Figure 3:
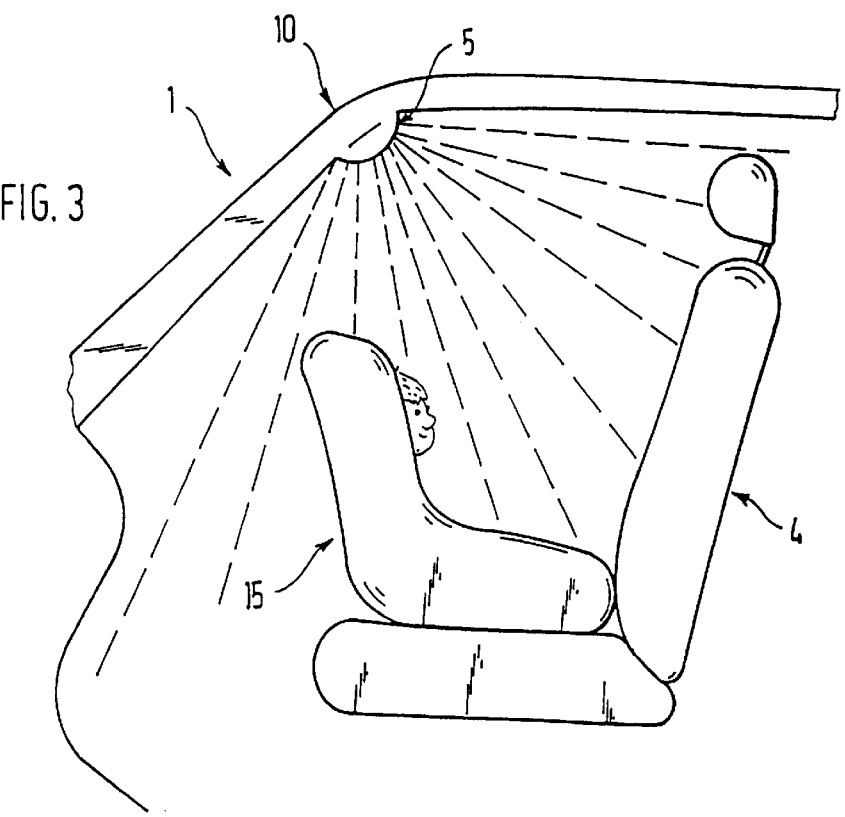
FIG. 3 is a partial side view illustrating an infant car seat occupying the passenger's seat in the motor vehicle of FIG. 1.

With particular reference now to FIG. 4, the sensing device 5 radiates the ultra sound signal in several directions I, II, and III, as illustrated, toward the partial space to be recorded and monitored. The arrangement illustrated in FIG. 4 is useful, for example, to record and monitor a person sitting in the passenger seat 4 whereby ray I of the ultra sound signal is directed toward the passenger's head, ray II of the signal is directed toward the passenger's pelvis, and ray III is directed toward the anterior edge of the passenger seat. Of course, FIG. 4 describes the case of the present invention employing three individual sensors to generate the three directions I, XI, and III of the ultra sound signal. In an alternative embodiment of the invention, sensor arrays or arrays of sensors having dynamic sound field formation or quantities of sensors other than the three described above are used to adapt the present invention to the changed conditions of recording and monitoring partial spaces in other applications. Those skilled in the art will appreciate that a plurality of sensors 6 and receivers 7, as well as a number of arrays of ultrasound sensors or multi-element sensors, sufficient in number, can be utilized in accordance with the present invention to address the particularities of the various diverse applications.

As best illustrated in FIG. 4, the sensing device 5 includes a multitude of transmitters 6 in the form of a group, arranged generally as shown. Among the group of transmitters 6 are arranged, as a preferred example, a plurality of receivers 7 grouped next to each other into staggered columns as illustrated. In the preferred embodiment illustrated, the advantageous characteristics of horizontal transmitters are combined with vertical receivers. As an alternative embodiment to the arrangement illustrated in FIG. 4, the combined horizonal transmitter characteristic and vertical receiver characteristic effect is achieved using sensors having ellipsoidal sound field characteristics such as, for example, phase controllable sensor arrays. As will be described in greater detail below, a high resolution is achieved when the contour of the object is scanned in the partial space using several beneficially, or optimally, oriented radiating transmitters 6 and directionally receiving receivers 7 disposed in a transducer unit, the arrangement of the transmitters and receivers resulting in the production of overlapping scan areas in the partial space.

Preferably, the transmitter 6 and receiver 7 is connected to an evaluation device (not shown). During use of the invention, ultrasound signals emitted by the transmitters 6 are reflected within the partial space as return signals and are recorded by the evaluation device in a time axis versus amplitude axis coordinate system. This enables, in the time axis, an evaluation with respect to the travel time of each ultrasound impulse and, thus, a determination of the distance the return signal has traveled in the reflected area. Further, this preferred recording scheme in the time versus amplitude axis coordinate system enables the recording of amplitude peaks for signal contour processing.

During use, in accordance with the present invention, signals are generated which facilitate analyzing the distances of the reflecting area and/or of the contours of the persons or items occupying such seats so that the determination is made whether a front seat 2 is occupied by a person or by an infant seat 15 with a child. The evaluation device (not shown) is adapted to activate accessories in the motor vehicle, such as, for example, an associated air bag, if it is determined, based on the signal evaluations, that a person is occupying a relevant seat 3, 4 and should, therefore, be protected by the air bag. In accordance with the present invention, the evaluation device does not activate the air bag, as an example, when it is determined that a backward facing infant seat is disposed in the passenger seat or when there is a lack of a person in the passenger seat, based on the signal evaluations.

Further in accordance with the present invention, a multitude of events such as "object (e.g., head) out of position" are detected. The above exemplary "head out of position" event occurs when a passenger rests in a forwardly inclined position, which is detected by the present invention. In that instance, the air bag is inflated, in case of an accident, at a lower pressure in order to protect the person disposed in such position from injury which would otherwise occur due to the close proximity of the passenger's head to the dashboard or, alternatively, with respect to the storage location of the air bag.

The preferred operating mode of the present invention will now be described in detail with reference to the devices and mechanisms shown in the drawing figures. As generally described above, a plurality of transmitters 6 arranged in the sensor mechanism 5 emit ultrasound signals in a manner to create an ultrasound field within the partial space 12 to be observed or monitored. The ultrasound field is characterized by the structure formed by the interior space contour of, in the preferred example, the motor vehicle, and all objects located therein, via interferences and travel time effects.

Figure 6:
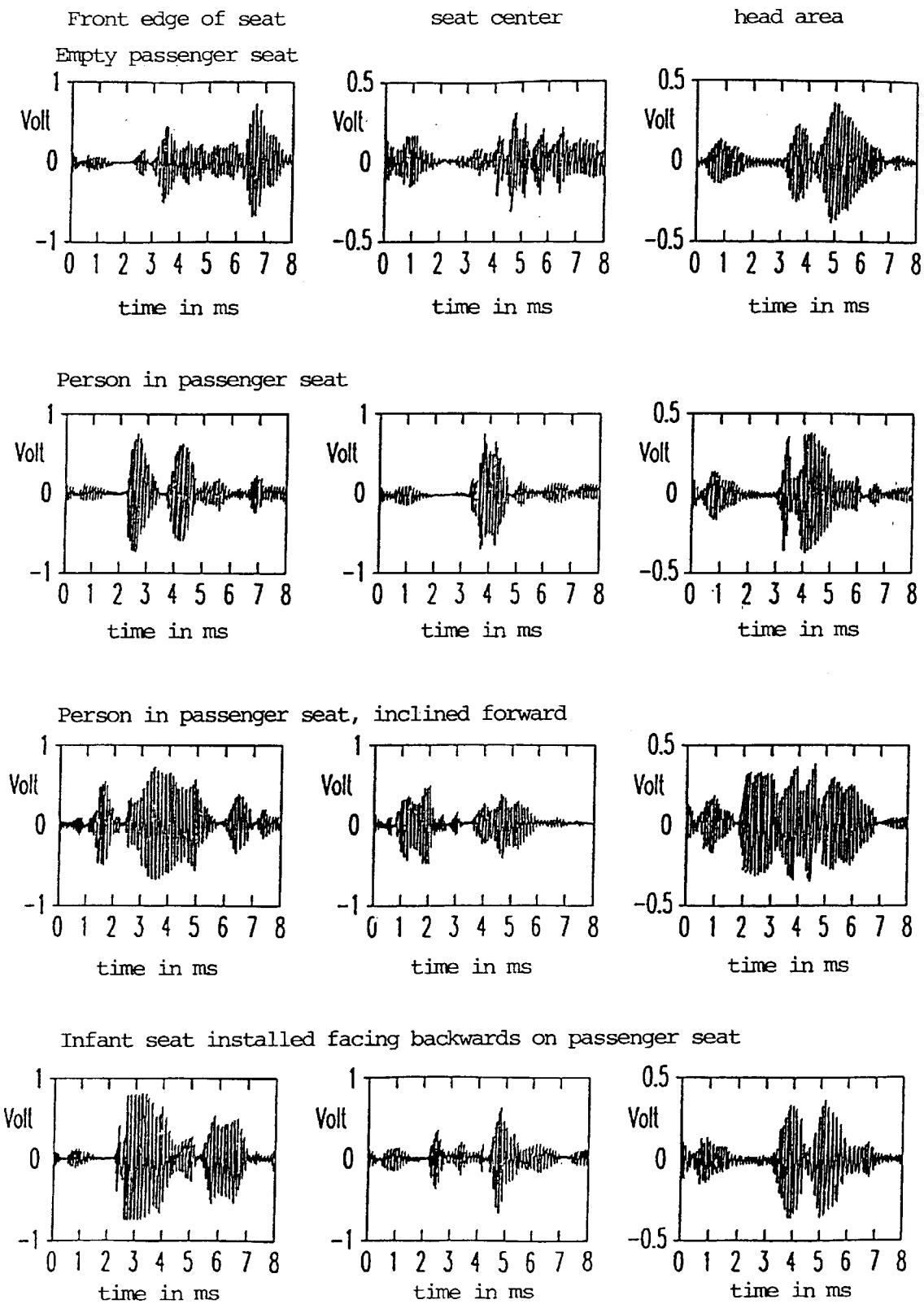

In one embodiment of the present invention, the ultrasound signals are beamed and received simultaneously. Alternatively, the ultrasound signals are beamed and received in a chronologically staggered fashion. In connection with chronological staggering, separate transmitter elements within the combined transmitter array 6 are energized during each of the chronologically staggered ultrasound generating time period. Similarly, single receiver elements within the array of receiver 7 of the sensor mechanism 5 are interrogated to capture the reflected ultrasound signals from within the partial space. In the specific preferred embodiment illustrated, a set of three (3) separate directions are chronologically staggered: I, II, and III, as shown best in FIG. 4. The chronological course of the ultrasound pressure of the above-described sound field is recorded, and preferably adjusted, at points at which the ultrasound mechanism or its receivers 7 or transducers are located. This can take place at one location, at several locations simultaneously, and/or in a multiplexed mode. As shown best in FIG. 6, the reflected sound signals are initially recorded as amplitude versus travel time curves. The signals are digitized and are then subjected to an analysis in order to extract characteristic structures and parameters therefrom. In accordance with the present invention, this signal processing is performed on each of the recorded signals.

In the simplest processing case, the recorded signals are analyzed by means of a time window review processing, whereby, at given points in time, for example at two (2) millisecond increments, the course of the signal is reviewed in a time window of defined duration, for example one (1) millisecond. In the event that, during such time window, the amplitude or amplitude peak of the signal lies above a predefined threshold value, then an event is considered as having occurred, such as, for example, "passenger seat at location II (seat center, FIG. 4) occupied by a person". Similarly, an event is considered as having occurred when there exists in said time window of the contour curve, a maximum value reached.

The above analysis is performed for each of the locations represented in FIG. 4. That is, an analysis is undertaken for direction I—head area, direction II—seat center, and direction III—front edge of seat. The analysis is undertaken for each of the above locations by successively creating and recording the sound fields from within the partial space.

In addition to the above, it is, however, also possible in accordance with the present invention to transmit into overlapping areas by generating signals from several transducers in combination simultaneously, such as, for example: I; II, I; III, II; III, I; II; III. In addition to the above, in accordance with the present invention, it is also possible to receive the reflected signals in combination from several directions: I; II, I; III, II; III, I; II; III. In the above cases, signal patterns are generated which are allocable to certain events by evaluation or recognition methods such as those described above.

As is apparent from the above, all obtained parameter sets, i.e., directions I, II, and III, at a given point in time are thus subjected to an individual evaluation. The result of the individual evaluation for each of the above-noted three directions set, provides the basis for a precise evaluation of the partial space. If the evaluation is unambiguous, the analysis result is accepted without further processing and the result stands firm. In the event, however, that the individual evaluation is ambiguous, the crucial free play is narrowed down by cross-comparisons between different data sets, or other time windows, to the extent that only one decision remains. If necessary for certain applications, the system according to the present invention is also capable of dynamically altering the physical measuring course according to specified requirements, such as, for example, a change in the number of recorded signals, a change in the sequencing of the generated and recorded signals, and a change in the composition of the multiplexing of the signal generating and signal recording. The refined result is incorporated as an input to a history log, such as, for example, in the simplest case, a sliding chronological means. The history log is used to determine the output magnitude of the system by algorithmic methods.

In accordance with yet another alternative embodiment of the present invention, the air bags or other motor vehicle accessories will be activated but, as to the air bags, with a change in their respective internal pressures, based upon a position of the seats, the position of the passenger on the seat, and the captured object contour.

The evaluation device of the present invention is further capable of activating and influencing restraining systems, such as, for example, restraining belts. It is further within the scope of the present invention that vehicle obstructions are eliminated if, for example, restraining systems are put back into place by persons who are registered in the seats.

In a further embodiment of the present invention, a subportion of the transmitters and/or receivers 6,7 of the sensor 5 are also used in order to prevent pinching or squeezing of body parts whenever electrical window openers are used by merely adjusting the beam direction of the ultrasound of the sensor 5 towards and registered with the window areas of the motor vehicle.

Further, it is also within the scope of the present invention to couple the evaluation device with an alarm unit, such as an anti-theft device. In that embodiment, whenever a person moves into the area of the recorded partial spaces, but with the vehicle being locked, the evaluation device causes the activation and triggering of the vehicle alarm device.

Further, in another embodiment, it is also possible to ascertain, via the evaluation device, movements of persons sitting in the seats, and, based thereon, to influence the air bags and/or restraining devices. Rather than a sensor 5 with stationary transmitters 6, it is also contemplated to be within the scope of the present invention to employ, for example, a vertically or horizontally pivoting transmitter 6 which scans the partial spaces over several positions.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

I claim:

1. A method of monitoring a partial space in a motor vehicle to determine occupancy of a seat in the motor vehicle, the method comprising the steps of:

using a first plurality of transmitters of a sensor device, directing ultra sound signals toward a partial space of a motor vehicle to generate a dynamic sound field in the partial space, the dynamic sound field being adaptable based on variable conditions in said partial space;

using a first plurality of receivers of said sensor device, sensing reflected ultra sound signals from the dynamic sound field as return beam signals;

in an evaluation device, recording the return beam signals with respect to at least one of a travel time difference and a signal amplitude contour; and evaluating the return beam signals with respect to an object contour based on an object contour in the partial space to determine an occupancy of a seat in the partial space of said motor vehicle.

2. The method according to claim 1, wherein the step of generating said dynamic sound field includes generating the dynamic sound field using at least one of a set of vertically pivotable transmitters and a set of horizontally pivotable transmitters.

3. The method according to claim 1, wherein the step of generating said dynamic sound field includes generating the dynamic sound field using phase-controllable transmitters of the sensor device.

4. The method according to claim 1, wherein the step of directing said ultra sound signals toward said partial space of the motor vehicle include directing said ultra sound signals in a plurality of directions using said first plurality of transmitters of the sensor device oriented in said plurality of directions.

5. The method according to claim 1, wherein the step of directing said ultra sound signals toward said partial space includes radiating said ultra sound signals in a pulse-like fashion in a form of a burst having several cycles.

6. A method of monitoring a partial space in a motor vehicle to determine occupancy of a seat in the motor vehicle, the method comprising the steps of:

using a first plurality of transmitters of a sensor device, radiating ultra sound signals in a pulse-like fashion toward a partial space of a motor vehicle to generate a sound field in the partial space, a repeat frequency of the pulse-like radiated bursts being based on at least one of an object to be observed in said partial space, a position of an object within the partial space, and an event in said partial space;

using a first plurality of receivers of said sensor device, sensing reflected ultra sound signals from the sound field as return beam signals;

in an evaluation device, recording the return beam signals with respect to at least one of a travel time difference and a signal amplitude contour; and evaluating the return beam signals with respect to an object contour based on an object contour in the partial space to determine an occupancy of a seat in the partial space of said motor vehicle.

7. The method according to claim 1, wherein the step of directing said ultra sound signals toward said partial space includes radiating said ultra sound signals in a form of a square wave.

8. The method according to claim 1, wherein the step of directing said ultra sound signals toward said partial space includes radiating said ultra sound signals in a form of a sinusoidal wave.

9. An apparatus for monitoring a partial space in a motor vehicle to determine occupancy of a seat in the motor vehicle, the apparatus comprising:

a first plurality of transmitters for developing ultra sound signals in a partial space of a motor vehicle to generate a dynamic sound field adaptable to variable conditions in the partial space;

a first plurality of receivers for sensing reflected ultra sound signals from the dynamic sound field as return beam signals; and a return signal evaluation device for recording the return beam signals with respect to at least one of a travel time difference and a signal amplitude contour, the return signal evaluation device evaluating the return beam signals with respect to an object contour based on an object contour in the partial space to determine an occupancy of a seat in the partial space of said motor vehicle to selectively enable and disable accessory units of the motor vehicle based on said occupancy of said seat.

10. The apparatus according to claim 9, wherein said first plurality of transmitters are pivotable.

11. The apparatus according to claim 9, wherein said first plurality of transmitters are phase-controllable transmitters.

12. The apparatus according to claim 9, wherein said first plurality of transmitters and said first plurality of receivers are adapted for mounting in at least one of a light dome area of an A pillar in an interior of said motor vehicle, and a ceiling of said motor vehicle.

13. The apparatus according to claim 12, wherein said first plurality of transmitters are oriented toward different areas of seats in said motor vehicle.

14. The apparatus according to claim 13, further comprising:

a plurality of additional transmitters, each of said plurality of transmitters being oriented toward different seat areas in said motor vehicle.

15. The apparatus according to claim 9, wherein said first plurality of transmitters and said first plurality of receivers are combined into groups, in one of a side-by-side relationship and an above and below relationship.

16. The apparatus according to claim 15, further including:

a plurality of grouped transmitters and receivers disposed in one of a vertically and horizontally grouped arrangement.

17. The apparatus according to claim 9, wherein at least one of said first plurality of transmitters and at least one of said first plurality of receivers of said sensor device are adapted for use with a second partial space of said motor vehicle including at least a window space.

18. The apparatus according to claim 9, wherein said return signal evaluation device is connected to transducers for indicating a seat position in said motor vehicle and a relative arrangement of seat parts in said motor vehicle.

19. The apparatus according to claim 18, wherein said return signal evaluation device is connected to an anti-theft device of said motor vehicle.

20. The method according to claim 1, wherein the step of generating said dynamic sound field includes generating the dynamic sound field based on variable spatial conditions in said partial space.

21. The method according to claim 1, wherein the step of generating said dynamic sound field includes generating the dynamic sound field based on algorithm requirements of the steps of recording said return beam signals and evaluating the return beam signals.

* * * * *